United States Patent
Carr et al.

(10) Patent No.: US 7,474,926 B1
(45) Date of Patent: Jan. 6, 2009

(54) HIERARCHICAL DEVICE SPIN-UP CONTROL FOR SERIAL ATTACHED DEVICES

(75) Inventors: Larrie Simon Carr, Nelson (CA); Heng Liao, Belcarra (CA)

(73) Assignee: PMC-Sierra, Inc., Santa Clara, CA (US)

( * ) Notice: Subject to any disclaimer, the term of this patent is extended or adjusted under 35 U.S.C. 154(b) by 283 days.

(21) Appl. No.: 11/390,264

(22) Filed: Mar. 28, 2006

Related U.S. Application Data

(60) Provisional application No. 60/666,725, filed on Mar. 31, 2005.

(51) Int. Cl.
*G05B 11/01* (2006.01)
(52) U.S. Cl. .................................... 700/19
(58) Field of Classification Search ............... 700/12, 700/14, 19, 296, 297, 305; 713/300, 330; 711/114
See application file for complete search history.

(56) References Cited

U.S. PATENT DOCUMENTS

| | | | | |
|---|---|---|---|---|
| 5,961,613 A * | 10/1999 | DeNicola | ................ | 710/18 |
| 7,221,531 B2 * | 5/2007 | Duerk et al. | ................ | 360/69 |
| 7,254,732 B2 * | 8/2007 | Bashford et al. | ............ | 713/324 |
| 7,343,500 B2 * | 3/2008 | Igari | ......................... | 713/300 |
| 2003/0115413 A1 * | 6/2003 | Wood et al. | .............. | 711/114 |
| 2003/0212857 A1 * | 11/2003 | Pacheco et al. | ............ | 711/114 |
| 2005/0289364 A1 * | 12/2005 | Strong et al. | .............. | 713/300 |

OTHER PUBLICATIONS

"Mator SATA MaxLine III"; Bios the esential IT guide; Jun. 23, 2004; pp. 1-2.*
"Serial ATA"; Wikipedia Apr. 22, 2008 pp. 1-11.*
Elliot, Rob; "Serail Attached SCSI Technical Overview"; May 6, 2002 pp. 1-114.*

* cited by examiner

*Primary Examiner*—Albert DeCady
*Assistant Examiner*—Chad Rapp
(74) *Attorney, Agent, or Firm*—Curtis B. Behmann; Borden Ladner Gervais LLP

(57) ABSTRACT

A method and apparatus are provided for controlling the powering-up or spin-up of devices such as hard drives using expanders in a SAS topology. The method and apparatus provides a mechanism to coordinate spin-up control among a topology of expanders. The present invention enables an expander to both process the reception of the NOTIFY command to spin up attached devices and to propagate such command to further expanders. Hierarchical spin-up control provides an advantageous, in-band mechanism that controls the expanders within the topology to limit the total number of devices powering-up at any given time.

22 Claims, 4 Drawing Sheets

HIERARCHICAL DEVICE SPIN-UP CONTROL FOR SERIAL ATTACHED DEVICES

CROSS REFERENCE TO RELATED APPLICATIONS

This application claims the benefit of priority of U.S. Provisional Patent Application Ser. No. 60/666,725 filed on Mar. 31, 2005, which is incorporated herein by reference.

FIELD OF THE INVENTION

The present invention relates generally to device spin-up control in serially attached topologies. More particularly, the present invention relates to hierarchical spin-up control within Serial Attached Small Computer System Interface (SCSI) (alternatively Serial Attached SCSI or simply SAS) topology and SAS expander devices.

BACKGROUND OF THE INVENTION

SAS protocol specifies a protocol stack that provides serial physical interconnect that can be used to connect storage devices such as Hard Disk Drives (HDD), host devices together. It specifies the transport layer protocols to transport SCSI commands, Serial Advanced Technology Attachment (alternatively Serial ATA or simply SATA) commands and management commands among storage devices. The SATA protocol is used in conjunction with SCSI and ATA command sets. The SAS protocol defines the function of SAS expanders, which are part of the service delivery subsystem and facilitates communication between SAS devices. In the general sense, the SAS expanders provide the switching and routing function among the SAS devices that are attached to such SAS expanders.

Multiple SAS end devices and SAS expander devices can be connected together to form a SAS topology. There can be one or multiple physical links connecting each pair of the neighbouring devices. When there is a single physical link between two devices, the associated phy on the SAS device is called a narrow port. When there are multiple physical links connecting two devices, the associated phys on an expander are considered to be a single wide port. In other words, all links of a wide port are considered to be a common logical link from routing perspective, although it allows multiple simultaneous connections to pass through the wide port at the same time. The SAS standard specifies that a legal SAS topology cannot contain a loop—i.e. there can be only one logical path to traverse the topology from any device to any other device (considering all links of a wide port to be a single link). Under such constraints, the only type of topology allowed by SAS specification is a spanning tree topology.

SAS expanders are required by the relevant American National Standards Institute (ANSI) specification to periodically generate the NOTIFY (ENABLE SPINUP) primitive that controls the spin-up of SAS drives. NOTIFY (ENABLE SPINUP) is transmitted by a SAS initiator port or expander port and is used to specify to a SAS target device that it may temporarily consume additional power (e.g., while spinning-up rotating media) while transitioning into the active or idle power condition state. The length of time the SAS target device consumes additional power and the amount of additional power is vendor specific. In general, the initial power surge is due to the crowbar current of the hard disk motor that spins the internal platter. This crowbar current can be as large as ten times the normal operating current used to maintain the platter spinning, move the read/write head and power the control electronics. For systems using arrays of hard disks, the spin-up of the platters are staged in time to prevent the crowbar currents of multiple hard drives from overwhelming the common power supply.

FIG. 1 illustrates one such known arrangement 100 within SAS topology including SAS blade servers 101 in communication with a high density tiered storage array 103 via a SAS blade switch 102. As noted, each storage array 103 is typically connected (e.g., by daisy chain) to another such array (not shown for clarity). Such storage array 103 is shown simplified for purposes of illustration and includes a SAS expander 106 and a power supply 105 in communication with multiple drives 104. The power supply 105 is sized to handle maximum spin up requirements and is therefore often oversized for normal operational requirements. The drives 104 may be SAS or SATA HDDs. In such an arrangement 100, spin up problems may exist with regard to disk drives 104 in which the given hard disk normally does not spin up its platter until the NOTIFY (ENABLE SPINUP) and the SCSI UNIT START/STOP command are both received from the SAS expander 106. If the SCSI START STOP UNIT (SBC-3) command is received, the command does not complete until NOTIFY (ENABLE SPINUP) is received or until the command timeouts. Thus, the NOTIFY (ENABLE SPINUP) is only a permission that gates spin-up, but does not actually start the spin-up process.

In general, SAS initiator devices and expander devices send NOTIFY (ENABLE SPINUP) while attached to SAS devices. The expander transmits one NOTIFY (ENABLE SPINUP) after power on when the enclosure is ready for initial spin-up. After the initial NOTIFY (ENABLE SPINUP), NOTIFY (ENABLE SPINUP) is transmitted periodically. Other than this, the selection of when and how often to transmit NOTIFY (ENABLE SPINUP) is outside the scope of the ANSI standard. Moreover, the SAS expander is not allowed to process the reception of a NOTIFY (ENABLE SPINUP) or propagate it. SAS expanders control the spin-up of SATA devices differently as SATA devices do not contain a power condition state machine similar to SAS. The typical method to prevent the spin-up of a SATA device is to not successfully complete speed negotiation of the physical link. That is, the speed negotiation does not progress past the COMWAKE event of the normal SATA speed negotiation sequence. In this state, the SATA drive is in the SATA HOLD state.

Normally, the spin-up of SATA disks is permitted by a host within the SAS topology by the SAS management protocol (SMP) target within the SAS expander. Specifically, a host uses the SAS expander SMP control to reset the serial link connected to the SATA drive to allow speed negotiation to complete. At this point, the SATA drive exits the SATA HOLD state and starts to spin-up the drive. For applications involving multiple hosts within a SAS topology or large number of arrays of hard disks, the coordination of spin-up within the topology is a difficult problem. The spin-up of large arrays of SATA hard drives within a SAS topology is a difficult problem with multiple hosts.

While the ANSI specification related to SAS teach the use of NOTIFY primitives for spin-up as part of the SAS Expander function to handle primitive broadcast, no teaching exists for using NOTIFY primitives to control SAS expanders. As described earlier, a SAS topology can contain a number of host, target, and expander devices. The expander is a multiple port device providing switching functionality among host, target, and other expander devices allowing any device to exchange information with any other device in the topology, though such topology is required to be without loops within each SAS domain.

There are no known techniques for SAS that address the problem of hard disk spin-up for an entire SAS topology. SAS expanders are expected to perform spin-up for the hard disks connected directly to that given SAS expander. For other protocols, there are some techniques for spin-up of hard disks that are different from the SAS expander model. Some methods are controlled using two electrical signals on the connector to the drive.

A first known method does not spin-up the platter until 3 seconds after power is applied to the drive. Staggered spin-up between hard drives is performed by staggering the power cycling of each drive. The 3 second delay allows the power supply to be stable before initiating the platter spin-up. This method may require additional components around the hard drive to control the power to the hard drive.

Another known method spins-up the platter when the host sends the SCSI START STOP UNIT command to the drive. This method may not work well in applications involving multiple hosts as the hosts need to coordinate the sending of this command in a fault tolerant manner.

A third known method waits 12 seconds times the modula 8 value of the numeric SEL_ID of the drive (as specified by the electrical connections). This allows 8 drives to spin-up in a coordinated manner over a period of 96 seconds. Unfortunately, this method may not work well for large arrays and may not be adaptive in the number of simultaneous drives allowed to spin-up.

Another known method is that the Seagate drive will not spin-up. That is, in this mode, the hard drive will not spin-up the platter until a different method is selected by the connector. This allows the hard disk spin-up to be controlled using a electrical interface on the disk. Again, some mechanism must be used to control this electrical interface to allow the staggered spin-up.

Some other approaches rely on idle timeouts to spin-down the disk and some protocol command to spin-up the disk, but do not describe mechanisms to stagger the spin-up of the hard disks.

As suggested above, there are commonly problems related to disk drive spin up where HDDs consume additional supply when they spin-up. The HDDs draw high current from a power supply for a few seconds: $I_{peak}$ After they are spun up, the active current draw is much smaller $I_{active} < I_{peak}$ In a chassis with N HDDs (where N is an integer greater than 1), if you allow all HDDs to spin up simultaneously, the peak current is $N*I_{peak}$ Often, a system designer may stagger the time the HDDs spin up in group of n (where n is another integer greater than 1) whereby the peak current is $(N-n)*I_{active} + n*I_{peak} < N*I_{peak}$ Such staggered spin-up reduces the peak current to the power supply and thus reduces the cost of the power supply. However, a mechanism is required to control the spin up of each HDD individually, and no such mechanism adequately exists in regard to SAS topology.

It is, therefore, desirable to provide coordination of either multiple hosts or expanders in a fault tolerant manner allowing an entire SAS topology to spin-up SATA and/or SAS HDDs in a coordinated manner to reduce peak current draw. This would reduce peak current draw required and therefore reduce the power supply requirements and related costs.

SUMMARY OF THE INVENTION

It is an object of the present invention to obviate or mitigate at least one disadvantage of previous SAS topology spin-up approaches.

In a first aspect, the present invention provides a method of controlling the spin-up of arrays of hard disks based on a type of primitive object transmitted and received as well as a method of controlling the powering of the devices within the network.

In a further aspect, the present invention provides a method of controlling target devices using expander primitives, the method including: setting a timer for an interval of time between power-up events of the target devices; upon expiration of the interval of time, examining all interrupt registers associated with detectors of the expander primitives in an upstream direction; upon indication that any of the interrupt registers are set, declaring a power-up event; and transmitting a predetermined primitive command so as to control the target device. The method is hierarchically applied to multiple expander devices including at least a first expander and a second expander, the method further including periodically sending the NOTIFY command from the first expander to the second expander, upon reception of the NOTIFY command at the second expander, propagating the NOTIFY command from the second expander to at least one of several other expanders if the at least one of several other expanders is present on a PHY of the second expander, spinning up one or more of the target devices if the one or more of the target devices is present on the PHY of the second expander, and repeating the propagating and spinning up steps for each of the several other expanders.

In a further aspect, the present invention provides an expander apparatus for controlling target devices using expander primitives, the apparatus including: a means for setting a timer for an interval of time between power-up events of the target devices; a means for examining all interrupt registers associated with detectors of the expander primitives in an upstream direction upon expiration of the interval of time; a means for declaring a power-up event upon indication that any of the interrupt registers are set; and a means for transmitting a predetermined primitive command so as to control the target device.

In a further aspect, the present invention provides an expander network in a SAS topology for hierarchically controlling target devices using expander primitives including a NOTIFY command, the network including: multiple expander devices including at least a first expander and a second expander; the first expander capable of periodically sending a NOTIFY command from the first expander to the second expander; the second expander capable of propagating, upon reception of the NOTIFY command at the second expander, the NOTIFY command to at least one of several other expanders if the at least one of several other expanders is present on a PHY of the second expander; and the second expander capable of spinning up one or more of the target devices if the one or more of the target devices are present on the PHY of the second expander.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Figure 1:
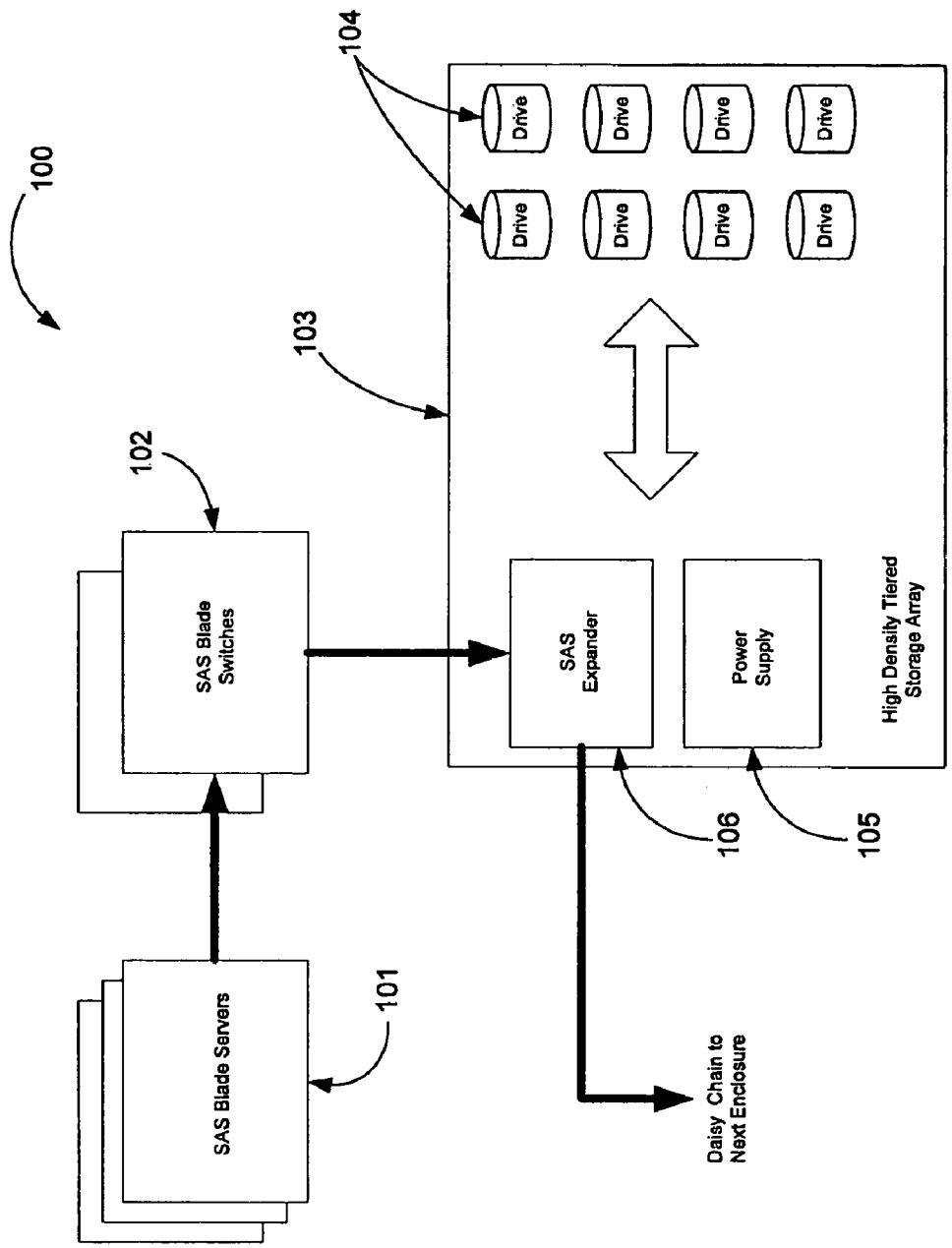
FIG. 1 shows a known SAS topology of server blades, switches, and expander with a related power supply and HDD array.
Figure 2:
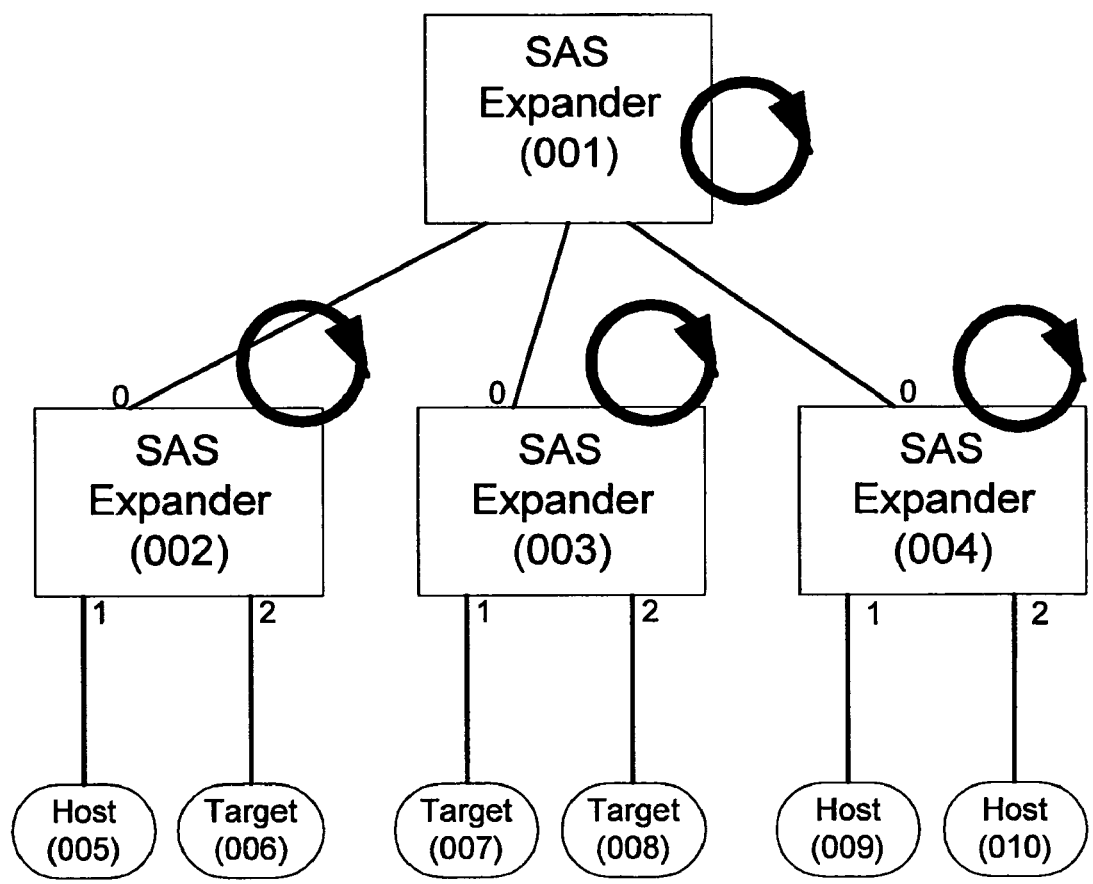
FIG. 2 shows a SAS topology of expanders using known method of operation.

Generally, the present invention provides a method and apparatus for hierarchical device spin-up control for serial attached devices. Moreover, the present inventive method and apparatus provides advantageous coordination of either multiple hosts or expanders in a fault tolerant manner allowing an entire SAS topology to spin-up SATA and/or SAS HDDs in a coordinated manner to reduce peak current draw. This reduces peak current draw required and therefore reduces power supply requirements and related costs. Advantageously, the present invention enables a SAS expander to both process the reception of a NOTIFY (ENABLE SPINUP) command and propagate such command.

The present invention utilizes the NOTIFY (ENABLE SPINUP) command in an innovative manner so as to control the powering-up, or spin-up, of hard drives (known as devices within the industry) using expanders in a SAS topology. SAS spin-up, as defined by the relevant ANSI specification, is controlled by restricting speed negotiation to SATA devices or by the reception of a SAS primitive by SAS devices. SAS expanders within the SAS topology are required to perform these tasks. However, the ANSI specification provides no mechanism to coordinate spin-up control among a topology of expanders. Hierarchical spin-up control in accordance with the present invention therefore provides an elegant, in-band mechanism that controls the expanders within the topology to limit the total number of devices powering-up at any given time.

Although this detailed description of the present invention address the spin-up of large arrays of SAS and/or SATA hard disks within a SAS topology, it should be understood that the same underlying concept can be applied to handle the power management of other type of non-SAS communication networks. One notable feature of the present embodiments involves the type of broadcast primitive object transmitted and received as well as the method for controlling the powering of the devices within the network. The use of the broadcast primitive formed by the NOTIFY (ENABLE SPINUP) command provides a viable mechanism to implement a robust method to stagger the powering of an array of hard drives without the using direct means of controlling actual power supply to each drive.

The staggering of crowbar current provided for by the present invention reduces size requirements of power supplies. This therefore reduces a significant cost when implementing arrays of hard disks. If the power supply is sized to handle simultaneous crowbar current of all the hard disks in the array, it would only be stressed during the initial power-on event. By reducing the power supply capability to handle the nominal power requirements with some margin to handle a small number of crowbar currents, the overall system cost can also be greatly reduced. The application of the present invention to other types of communications networks than SAS topologies would also provide similar benefits to those communications network including low cost power supplies.

Figure 3:
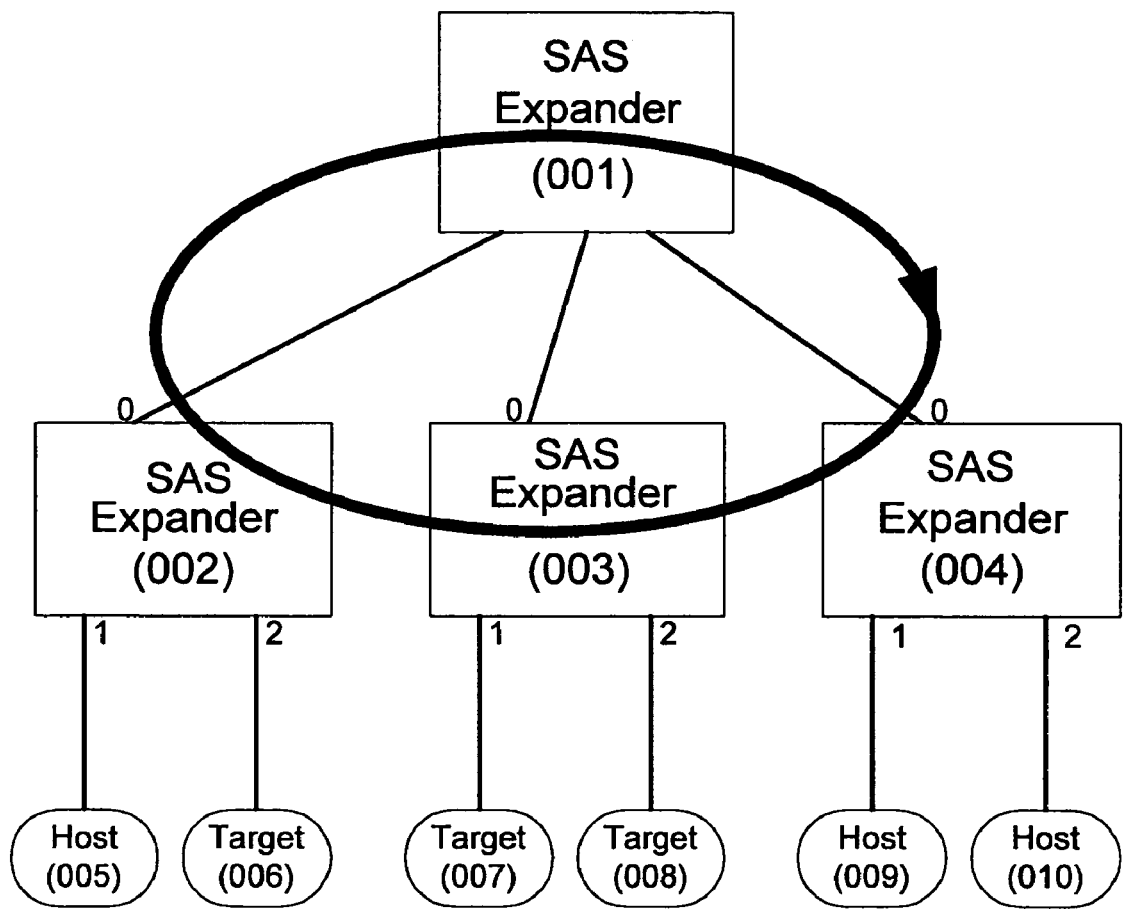
FIG. 3 shows a SAS topology of expanders similar to that of FIG. 2 but using the present inventive method of operation.
Figure 4:
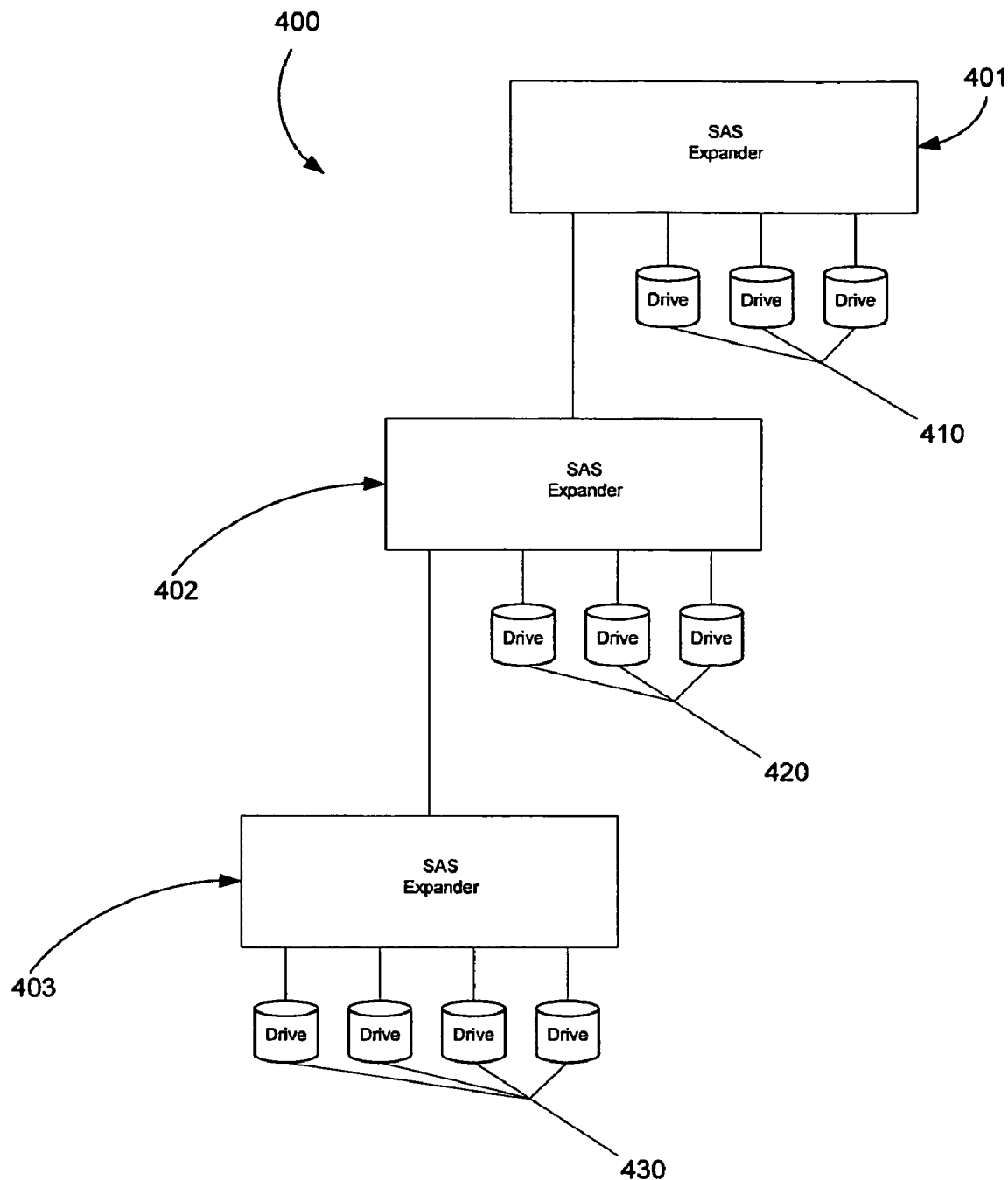
FIG. 4 shows a SAS topology of expanders in accordance with one embodiment of the present invention.

FIGS. 3 and 4 contrast the known operation (FIG. 3) and inventive operation (FIG. 4) as applied to a traditional hierarchical SAS topology illustrated with a first SAS expander 001 spanning three lower SAS expanders—i.e., SAS expander 002, SAS expander 003, and SAS expander 004. All SAS specification-compliant topologies can be shown in this fashion, although many actual variations can exist. FIG. 3 generally illustrate that each SAS expander performs the periodic transmission of NOTIFY (ENABLE SPINUP) independently of each other. In this example, the NOTIFY primitives from SAS expander 001 are ignored by the other expanders 002, 003 and 004 due to the ANSI specifications requirements related to SAS. The spin-up of the targets (e.g., HDDs) 006, 007, and 008 is uncoordinated as each expander is operating independently. There is no mechanism to coordinate the spin-up such that hard drives 006, 007, and 008 spin-up one after another.

The present innovative solution is for SAS expander spin-up to be coordinated throughout the network. Accordingly, FIG. 3 shows a representation of the present inventive operation. The timing of the spin-up events involves all the expanders 001, 002, 003, and 004 within the SAS topology, not just the expanders attached to targets 006, 007, and 008. In accordance with the present invention, expander 001 transmits the NOTIFY primitive in a SAS compliant manner. However, the expanders 002, 003 and 004 operate in a hierarchical spin-up manner. That is, the reception of the NOTIFY primitive on link 0 of each of these expanders cause the expanders to advance the internal spin-up function. That is, the transmission of the NOTIFY primitive by expanders 002, 003, and 004 is dependent on the reception of the NOTIFY primitive by expander 001.

An illustration of another such SAS topology 400 utilizing the present invention is shown in FIG. 4. For clarity of illustration, only three SAS expanders 401, 402, and 403 are shown. However, it should be noting that many more such expanders than shown in FIG. 4 can be arranged cooperatively so as to provide a much larger hierarchical arrangement without straying from the intended scope of the present invention. The SAS expanders 401, 402, and 403 are operatively connected to respective drives 410, 420, and 430. The number of drives may of course vary according to array requirements in any given application. Such drives 410 are preferably SAS and/or SATA HDDs, though other devices are possible. The SAS expander 401 is further operatively connected to another SAS expander 402.

In accordance with the present invention, the second SAS expander 402 is effectively treated as another one of drives 410 such that a NOTIFY command received by the SAS expander 401 will spin up drives and also enable SAS expander 402. In turn, SAS expander 402 treat SAS expander 403 as just another one of drives 420 such that a NOTIFY command received by the SAS expander 402 will spin up drives 420 and also enable SAS expander 403.

An advantage of the present invention is therefore readily apparent from FIG. 4. Specifically, SAS expander 401 both processes the reception of a NOTIFY command to spin up drives 410 and propagates such NOTIFY command to SAS expander 402. In turn, SAS expander 402 both processes the reception of the NOTIFY command to spin up drives 420 and propagates such NOTIFY command to SAS expander 403 which then processes the reception of the NOTIFY command to spin up drives 430. It should be understood that each SAS expander 401, 402, and 403 itself may include certain predetermined spin up limitations such that only one drive at a time will be enabled to spin up. Further, it is readily apparent that many variations are within the scope of a coordinated spin up according the present invention. As particular further examples, only certain groups of drives at a time or only certain groups of SAS expanders with associated drives or groups of drives at a time will be enabled to spin up. In this manner, a hierarchical spin up process can occur and be controlled via the NOTIFY command received and propagated.

Embodiments of the present invention can be implemented using hardware, firmware, and/or software components within the system. An approach using both hardware and firmware is presently preferred mainly due to the speed requirement for the primitive detector/transmitter, existing speed negotiation hardware, and the reuse of an existing microprocessor to implement the long time constant timers.

Implementation of the present invention includes at least four basic elements including a SAS primitive detector, a SAS primitive transmitter, link speed negotiation, and a spin-up microprocessor.

The SAS primitive detector is attached to each serial SAS link on the SAS expander. It is used to detect the reception of a NOTIFY (ENABLE SPINUP) primitive on a particular SAS link. In order for the microprocessor to detect the event, the primitive detector triggers an interrupt register. In some embodiments, multiple receptions of the NOTIFY (ENABLE SPINUP) primitive can be aliased into a single interrupt event. As the reception of NOTIFY (ENABLE SPINUP) is periodic in nature, a best-attempt to service interrupt events will still eventually spin-up all hard disks (a bit slower).

Other embodiments may include the detection of different SAS primitives such as primitives marked as RESERVED within the SAS specification. As well, instead of an interrupt to trigger the microprocessor, counters can be used to precisely track all primitive receptions. Also, multiple primitive types can be used to convey additional information such as to spin-up faster or slower as well as spin-up more or less hard disks per primitive event.

The SAS primitive transmitter is attached to each serial SAS link on the SAS expander. It is used to transmit NOTIFY (ENABLE SPINUP) primitive on a particular SAS link. As the transmission event is controlled by the microprocessor, a primitive transmitter is triggered by a self-clearing write trigger. The trigger register is enabled by writing a logical high to the register indicating that the primitive should be transmitted at the next possible opportunity that does not violate the SAS specification (for instance, between SAS packets). The trigger register preferably clears when the primitive is transmitted.

Other embodiments can include the transmission of different SAS primitives instead of the NOTIFY (ENABLE SPINUP) to convey other information related to spin-up. Examples include communicating to the downstream expanders to spin-up faster or slower as well as spin-up more or less hard disks per primitive event. In general, a NOTIFY (ENABLE SPINUP) primitive transmitter is preferably provided because the SAS hard drives only understand that primitive and expanders are expected to periodically transmit this primitive (as opposed to detecting the primitive).

Link speed negotiation is another element of the present invention. By definition, SAS expanders contain speed negotiation logic as described by the SAS specification. This state machine logic is responsible for identifying the type of device attached to the expander link, determining the supported link rates for both devices and bringing up the link. The state machine logic is also responsible for putting the link into SATA HOLD state (withholding the COMWAKE event from the SATA hard disk) as well as completing the SATA hold event.

In one embodiment, the microprocessor uses a self-clearing write trigger to control the speed negotiation state machine to exit the SATA HOLD state. The write trigger is enabled by writing a logical high to the trigger indicating the state machine should exist the hold state. The trigger is cleared when the link exits (or is not in) the hold state. This trigger can be provided to implement the SAS management protocol commands such as the SMP PHY CONTROL. For the SMP PHY CONTROL command, certain operations such as LINK RESET or HARD RESET for a particular link cause a link to exit the SATA HOLD state. To implement the automatic spin-up of SATA hard drives, this trigger can be used by the microprocessor.

The microprocessor can also have the ability to read the state of the state machine in order to determine the type of device attached to the expander link. This information can be used by the microprocessor to determine the type of device. Other embodiments to implement the state machine include implementing the entire speed negotiation state machine within a microprocessor.

The spin-up microprocessor implements the spin-up method using the already described hardware. The following is a brief description of the method that combines the periodic sending of NOTIFY primitives with the spin-up method.

In general, the microprocessor contains a timer that sets the spin-up interval. The timer is periodic, but the period can vary. Specifically, the first time period on power-on may be different than subsequent time periods to allow the power supplies to stabilize before the first spin-up event. Normally, when the timer expires, the microprocessor would trigger the transmission of the NOTIFY (ENABLE SPINUP) primitive on one or more links attached to SAS devices by writing a logical high to the self-clearing trigger. This implementation would make the expander operate in a SAS compliant manner (periodic transmission of the NOTIFY primitive on the serial links). However, for hierarchical spin-up control, the microprocessor should wait for the reception of a NOTIFY (ENABLE SPINUP) primitive before transmitting a NOTIFY (ENABLE SPINUP) primitive. Thus, when the timer expires, the microprocessor examines all interrupt registers associated with the primitive detectors in the upstream (towards the higher SAS topology expanders) direction.

In a presently preferred embodiment, if any of these interrupts are set, a spin-up event is declared. However, other embodiments are possible including requiring more than one interrupt to be set. Also, instead of polling the interrupt registers, a fully interrupt based method can be used. When a spin-up event occurs, the microprocessor will attempt to "spin-up" a number of devices attached to the SAS expander. The number of devices (or spin-up group size) can be a constant or variable number. While a constant number can be easier to implement, a variable number can take advantage of the power-on event. Specifically, the number of crowbar currents the power supply can support decreases as the number of spun-up hard drives increases due to the idling current required by the spun-up hard drives. Thus, other embodiments can take advantage of more elaborate group size control based on knowledge of the number of spun-up drives.

For SAS devices marked for "spin-up", the microprocessor triggers the transmission of the NOTIFY (ENABLE SPINUP) primitive by writing a logical high to the self-clearing trigger register. For SATA devices marked for "spin-up" that are currently held in SATA HOLD state, the microprocessor informs the speed negotiation state machine to release the link and allow speed negotiation to complete.

The implementation has a number of variations controlling when the devices are spun-up. For SATA drives, the spin-up control also allows for immediate spin-up when the SATA disk was attached (the drive is not allowed to enter SATA HOLD state) as well as a host gated spin-up control. Specifically, a link in SATA HOLD state has to receive a SMP PHY CONTROL LINK RESET or SMP PHY CONTROL HARD RESET. Normally, these SMP commands would cause the drive to exit the SATA HOLD state, but in this mode, the drive is tagged for spin-up. This tagging allows the microprocessor to spin-up the drive when it gets to the link. Otherwise, the link is not spun-up.

Other embodiments can include one or more of the following alternative implementations: not using groups (a single link is considered for each spin-up event); not using a interval timers (spin-up events occur during reception of the triggering primitive); using more than one triggering primitive to control constants within the method (such as the size of spin-up groups or time intervals); and transmitting different primitives (to modify spin-up downstream from the expander).

In a presently preferred implementation, upstream and downstream are configured by the user using an external EEPROM to mark the "host side" or upstream and the "drive side" or downstream. In other embodiments, the microprocessor can use the internal SAS expander table routing information to determine the SAS expander's location within SAS topology. Another embodiment can examine the SAS data stream or SAS IDENTIFY information to determine which expander links are connected to SAS targets. Another modification to the method is to handle SAS wide ports. The implementation described thus far deals with spin-up on a per link (PHY) basis. An alternative implementation can treat wide-ports (multiple PHYs connected between two devices) as a single port (send NOTIFY primitives over all links within the wide-port for a given spin-up event).

Embodiments of the present invention can be implemented in an Application Specific Standard Integrated Circuit Product (ASSP). The spin-up functionality can be implemented in functional blocks (TSB) called the SXL and EMIP. The SXL block comprises a NOTIFY (ENABLE SPINUP) primitive detector/receiver and NOTIFY (ENABLE SPINUP) primitive transmitter. The EMIP is a 32-bit processor that comprises firmware that implements the spin-up functionality. It should be noted that the same method can be implemented using other means of realization such as using a combination of software and hardware. One implementation utilizes programmable logic devices such FPGA to implement the logic. Some products can implements embodiments of the present invention in SXL_LT and MIPS__4KEM blocks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of controlling target devices in a Serial Attached Small Computer System Interface (SAS) topology using expander primitives, said method comprising:
   setting a timer for an interval of time between power-up events of said target devices in said SAS topology;
   upon expiration of said interval of time, examining all interrupt registers associated with detectors of said expander primitives in an upstream direction;
   upon indication that any of said interrupt registers are set, declaring a power-up event; and
   transmitting a predetermined expander primitive command so as to control said target device in said SAS topology.

2. The method as claimed in claim 1 wherein said step of declaring said power-up event occurs upon indication that more than one said interrupt registers are set.

3. The method as claimed in claim 1 wherein said transmitting step provides said predetermined primitive command to a group including more than one said target device.

4. The method as claimed in claim 3 wherein said group includes a constant number of said target devices.

5. The method as claimed in claim 3 wherein said group is a variable number of said target devices.

6. The method as claimed in claim 1 wherein said primitive command is an enable spinup (NOTIFY) command, said power-up event is spin-up, said target devices are hard disk drives, and said NOTIFY command directs spinning up of said hard disk drives.

7. The method as claimed in claim 6 wherein said method is hierarchically applied to multiple expander devices including at least a first expander and a second expander, said method further including
   periodically sending said NOTIFY command from said first expander to said second expander,
   upon reception of said NOTIFY command at said second expander,
      propagating said NOTIFY command from said second expander to at least one of several other expanders if said at least one of several other expanders is present on a Physical layer (PHY) of said second expander,
      spinning up one or more of said target devices if said one or more of said target devices is present on said PHY of said second expander, and
      repeating said propagating and spinning up steps for each of said several other expanders.

8. The method as claimed in claim 7 wherein said hard disk drives include SAS devices.

9. The method as claimed in claim 8 wherein said transmission of said NOTIFY command is accomplished by writing a logical high to a self-clearing trigger register.

10. The method as claimed in claim 7 wherein said hard disk drives include Serial Advanced Technology Attachment (SATA) devices.

11. The method as claimed in claim 10 wherein said transmission of said NOTIFY command is accomplished by informing a speed negotiation state machine to release a link and allow speed negotiation to complete.

12. A computer program product tangibly embodied in a computer readable medium for controlling target devices in a Serial Attached Small Computer System Interface (SAS) topology using expander primitives, comprising instructions for causing a computer to:
   set a timer for an interval of time between power-up events of said target devices in said SAS topology;
   examine all interrupt registers associated with detectors of said expander primitives in an upstream direction upon expiration of said interval of time;
   declare a power-up event upon indication that any of said interrupt registers are set; and
   transmit a predetermined expander primitive command so as to control said target device in said SAS topology.

13. The computer program product as claimed in claim 12 wherein declaring said power-up event is triggered upon indication that more than one said interrupt registers are set.

14. The computer program product as claimed in claim 12 wherein said predetermined primitive command is transmitted to a group including more than one said target device.

15. The computer program product as claimed in claim 14 wherein said group includes a constant number of said target devices.

16. The computer program product as claimed in claim 14 wherein said group is a variable number of said target devices.

17. The computer program product as claimed in claim 12 wherein said primitive command is an enable spinup (NOTIFY) command, said power-up event is spin-up, said target devices are hard disk drives, and said NOTIFY command directs spinning up of said hard disk drives.

18. The computer program product as claimed in claim 17 wherein said hard disk drives include SAS devices.

19. The computer program product as claimed in claim 18 wherein transmission of said NOTIFY command is by writing a logical high to a self-clearing trigger register.

20. The computer program product as claimed in claim 17 wherein said hard disk drives include Serial Advanced Technology Attachment (SATA) devices.

21. The computer program product as claimed in claim 20 wherein transmission of said NOTIFY command is by informing a speed negotiation state machine to release a link and allow speed negotiation to complete.

22. An expander network in a Serial Attached Small Computer System Interface (SAS) topology for hierarchically controlling target devices using expander primitives including an enable spinup (NOTIFY) command, said network comprising:

multiple expander devices including at least a first expander and a second expander;

said first expander capable of periodically sending said NOTIFY command from said first expander to said second expander in said SAS topology;

said second expander capable of propagating, upon reception of said NOTIFY command at said second expander, said NOTIFY command to at least one of several other expanders if said at least one of several other expanders is present on a Physical layer (PHY) of said second expander; and said second expander capable of spinning up one or more of said target devices if said one or more of said target devices in said SAS topology are present on said PHY of said second expander.

* * * * *